United States Patent [19]

Williams

[11] 4,146,203
[45] Mar. 27, 1979

[54] PIPE HANGER SUPPORTS

[76] Inventor: Robert O. Williams, 2264 Weber Rd., Gladwin, Mich. 48624

[21] Appl. No.: 843,851

[22] Filed: Oct. 20, 1977

[51] Int. Cl.² .............................................. F16L 3/22
[52] U.S. Cl. ..................................... 248/62; 138/107; 138/149; 248/68 R
[58] Field of Search ................... 248/62, 68 R, 58, 59, 248/49; 138/107, 106, 146, 147, 149, 151, 162

[56] References Cited

U.S. PATENT DOCUMENTS

| | | | |
|---|---|---|---|
| 3,151,633 | 10/1964 | Shuman | 138/149 X |
| 3,530,899 | 9/1970 | Breeding | 138/107 |
| 3,563,503 | 2/1971 | Lancaster | 138/106 X |
| 3,563,825 | 2/1971 | Segura et al. | 138/106 X |

Primary Examiner—Rodney H. Bonck
Attorney, Agent, or Firm—Price, Heneveld, Huizenga & Cooper

[57] ABSTRACT

A pipe hanger assembly having a pipe supporting and thermal insulating housing suspended in a hanger, the housing having a cylindrical outer surface matching the size and configuration of the adjacent pipe insulation jacket, and having a basically cylindrical inner passage the axis of which is parallel to and vertically offset from the axis of the outer surface. The housing is formed of a larger part and a smaller part, the outer surface portion of the larger housing part extending more than 180 arcuate degrees and the outer surface portion of the smaller housing part extending less than 180 arcuate degrees, the two together equalling 360°. The inner surface portions of both parts each extend 180°. The lower part is rigid and supports the pipe in the inner passage. At least one channel is located in the inner surface portion of the larger part to receive a tracer line.

3 Claims, 6 Drawing Figures

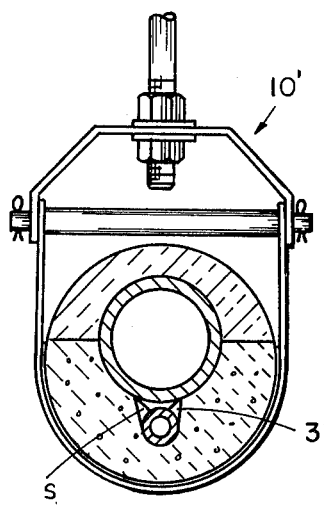
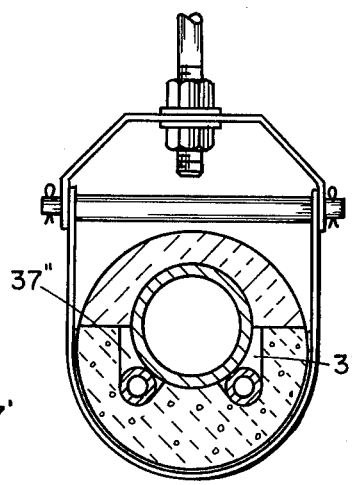
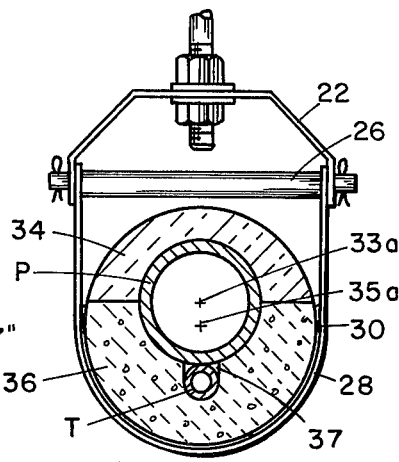
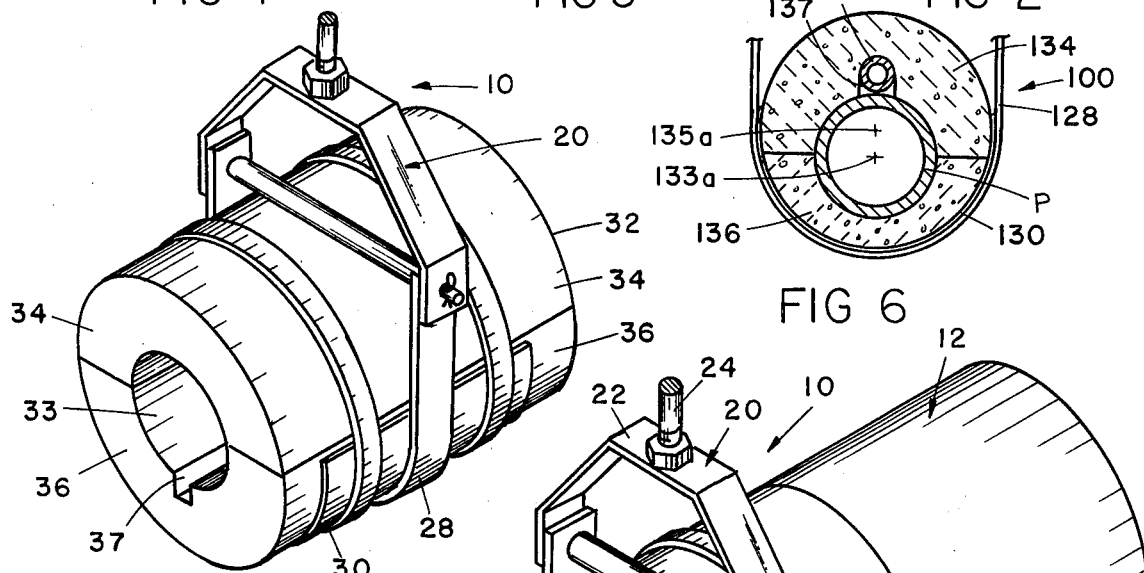
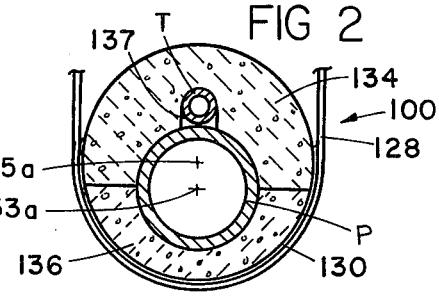
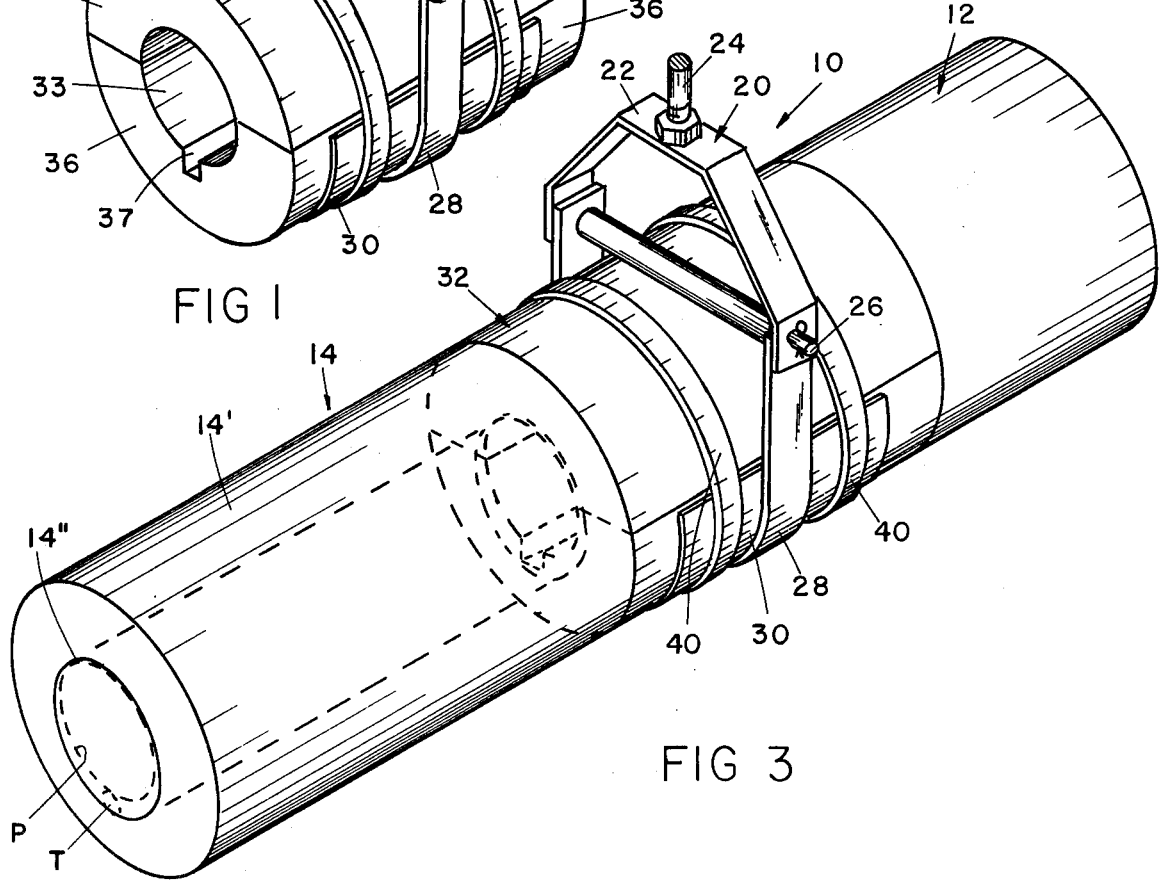
FIG 4
FIG 5
FIG 2
FIG 1
FIG 6
FIG 3

PIPE HANGER SUPPORTS

BACKGROUND OF THE INVENTION

This invention relates to a pipe hanger assembly useful in conjunction with adjacent pipe insulation, capable of accommodating conventional type hanger brackets, and accommodating tracer lines, preferably along the under surface of the pipe that is supported.

The use of thermal insulating jackets around outdoor pipes, as for chemical processing, is increasingly necessary and/or desirable. Frequently, a temperature controlling liquid in an adjacent tracer line is also employed. Typically, outdoor pipes are suspended by pipe hangers spaced at intervals along the pipe and extending around and beneath the pipe. The standard insulation jacket on such pipe is cylindrical in shape, being formed of a pair of semicylindrical halves having an inner passage large enough to accommodate the pipe and one or more underlying tracer lines which transmit heat up into the pipe. Processors basically will use only standardized, cylindrically configured insulation jackets since such are more readily manufactured, less costly, widely adaptable to the job, and readily stocked, handled, and assembled.

When tracer lines are employed, a problem arises at the pipe hanger. The tracer line typically rises up to the top part of the pipe to avoid compressive load thereon between the pipe and hanger, and then back down to its most effective bottom position. To allow this position deviation of the tracer line, the insulation at the pipe hanger is large, bulky, and sometimes distorted, creating an undesirable condition, yet one which has been tolerated for lack of anything better.

Efforts have been made heretofore to market a hanger assembly that would accommodate the tracer line by employing a special annular or egg-shape housing configuration to fit the components. However, such product was a "bastard" product incompatible with standardized cylindrical pipe insulation, and therefore did not succeed. The cost was prohibitive, and application of the product was limited.

SUMMARY OF THE INVENTION

This invention involves a pipe hanger assembly suspending a pipe and tracer line in an insulating housing that is actually cylindrical, being fully compatible with adjacent cylindrically shaped pipe insulation jackets. The cylindrical insulating housing is formed of a smaller part and a larger part, the smaller part preferably being the upper part. The smaller upper part has an outer surface portion extending less than 180 arcuate degrees, and the larger part has an outer surface portion extending more than 180 arcuate degrees, with the two together equalling 360°. This housing forms a basically cylindrical inner passage having an axis parallel to and offset vertically from the axis of said housing surface. There is at least one channel in the inner passage portion of said larger part to receive a tracer line. At least the lower part is rigid to support the pipe, being made of a thermally insulating material which preferably is of foam refractory. A hanger strap extends beneath and around the housing to suspend it and the pipe.

BRIEF DESCRIPTION OF THE DRAWINGS

FIG. 1 is a perspective view of the novel assembly;
FIG. 2 is a sectional view of the assembly in FIG. 1;
FIG. 3 is a perspective view of the novel assembly in FIG. 1 associated with adjacent pipe insulation;
FIG. 4 is a sectional view of a second slightly modified version of the assembly;
FIG. 5 is a sectional view of another modified version of the assembly; and
FIG. 6 is a sectional view of another form.

DESCRIPTION OF THE PREFERRED EMBODIMENT

Referring now specifically to the drawings, the novel pipe hanger assembly 10 is shown combined with adjacent conventional pipe insulation jackets 12 and 14 (FIG. 3). Each of conventional insulation units 12 and 14 has a standardized cylindrical configuration, with a cylindrical outer surface e.g. 14' and a cylindrical inner surface e.g. 14" coaxial with the outer surface. The inner surface defines an inner passage of a diameter equal to the diameter of the pipe P insulated plus the diameter of at least one tracer line T (shown in phantom in FIG. 3). The tracer line typically underlies the pipe so that heat from the tracer line can most effectively be transferred upwardly into the pipe and into the contents transported therethrough. Insulation for jackets 12 and 14 typically comprises fibrous glass or soft foam, enveloped by a suitable retention sleeve. Jackets 12 and 14 can each be formed of two semicylindrical halves for easy assembly and can be of any desired length. These straddle and abut the ends of the novel hanger assembly 10 having an outer cylindrical surface equal in diameter to and compatible with adjacent jackets 12 and 14.

At the hanger bracket assembly, it is usually desirable to have the tracer line or lines remain beneath the pipe or conduit being heated. However, if the hanger bracket supports the assembly with the pipe or conduit resting upon the tracer line, the latter can be crushed or deformed undesirably. Consequently, it has been past practice to cause the tracer line to be curled up over the top of the pipe at the pipe hanger, and then be returned back to the bottom of the pipe.

Hanger assembly 10 includes hanger 20 having a top bracket 22 suspended from a stud or rod 24 and pivotally connected by a transverse pivot bar 26 extending through the lower ends of bracket 22 and the upper ends of a U-shaped hanger band 28 as of nylon, stainless steel, flexible tape, or other material. Supported within the semicircular inner surface of hanger band 28 is an arcuate semicylindrical saddle 30. Resting within saddle 30 is a thermal insulating housing 32 formed of an upper part 34 and a lower part 36. Upper part 34 has an outer surface which is part of a cylinder, but being less than 180° in an arc swept from the axial centerline 35a of the housing 32. The outer surface of lower part 36 forms a second portion of the cylinder, but extending greater than 180° in an arc swept from the axial centerline 35a of the housing 32. The outer surface of upper part 34 and lower part 36 combined forms 360° and presents a right circular cylindrical surface to cooperate with existing insulation jackets 12 and 14. These two parts are retained together and to the saddle 30 as by a set of peripheral compression bands 40.

Upper and lower parts 34 and 36 also define an inner passage 33 having a basically cylindrical configuration, the central axis 33a (FIG. 2) of which is parallel with and offset vertically above the central axis of the outer cylindrical surface 35a of the unit. The semicylindrical inner surface of the upper part extends 180° in an arc swept from the axial centerline 33a of the inner passage 33, as does the lower semicylindrical surface of the lower part, the two collectively forming 360°. This inner passage is described as "basically" cylindrical because the cylindrical shape has one or more channels the length thereof as will be described.

This lower part of the housing is formed of a material which not only has thermal insulation characteristics, but also compressive support. Preferably it constitutes a foam refractory material, e.g. a foam or cellular glass such as the product "Foam Glass" by Pittsburgh Plate Glass (PPG). The upper part can however be of a compressible material such as fibrous glass for thermal insulation properties, or may be of other suitable thermally insulating material, whether rigid or flexible.

Within the lower part inner surface (FIGS. 1–5) is formed one or more channels 37 extending the length thereof for receiving one or more tracer lines. In the embodiment depicted in FIGS. 1, 2 and 3, there is a single channel for supporting a tracer line T immediately in contact with the conduit or pipe P. In FIG. 4 is shown a modified assembly 10' wherein the channel 37' is somewhat deeper such that the tracer line can be out of direct contact with the pipe, spaced from it by a suitable spacer S which can be shaped to improve the surface contact with both the pipe and the tracer line. In FIG. 5 is depicted a modified assembly 10'' wherein two channels 37'' are formed to receive a pair of tracer lines extending through the assembly.

The assembly 100 in FIG. 6 has the inner passage axis 135a or centerline offset vertically downwardly from the axis 133a of housing outer periphery such that the smaller housing part 136 is here the lower part and the larger upper part 134 has the tracer line channel 137 for tracer line T. The bottom part is rigid to support the pipe P in the saddle 130 which in turn is supported by hanger band 128.

When assembled, the pipe hanger assembly can be readily sealed to the adjacent jackets as by overlap-taping at the junctures between the equal diameter elements, or the equivalent. The entire assembly has a cylindrical shape, fulfilling the specifications of standardized equipment.

The embodiments of the invention in which an exclusive property or privilege is claimed are defined as follows:

1. A pipe and tracer line hanger assembly comprising:
a pipe supporting and thermal insulating housing having an outer surface of right circular cylindrical configuration to cooperate with existing insulation, said housing formed of a smaller upper part and a larger lower part, said upper part having an outer surface portion extending less than 180 arcuate degrees in an arc swept from the axial centerline of said housing, and said lower part having an outer surface portion extending more than 180 arcuate degrees in an arc swept from the axial centerline of said housing with said outer surface portions together forming a 360° cylinder; said upper and lower parts together also forming a basically cylindrical inner passage having an axis parallel to and offset from the axis of said outer cylindrical surface, said upper part and said lower part each having an inner surface portion extending 180° in arcs swept from the axial centerline of said inner passage; said lower part inner surface portion having channel means the length thereof to receive a tracer line; said lower part being rigid to support a pipe in said inner passage; and a hanger suspending said lower part.

2. A pipe and tracer line support subassembly for placement within a pipe hanger comprising:
a pipe supporting and thermal insulating housing having an outer surface of right circular cylindrical configuration to cooperate with existing insulation, said housing formed of a smaller upper part and a larger lower part, said upper part having an outer surface portion extending less than 180° in an arc swept from the axial centerline of said housing, said lower part having an outer surface portion extending more than 180° in an arc swept from the axial centerline of said housing and together extending 360°; said upper and lower parts together also forming a basically cylindrical inner passage having an axial centerline parallel to and offset from the axial centerline of said outer cylindrical surface, said upper part and said lower part each having an inner surface portion extending 180° in arcs swept from the axial centerline of said inner passage; and said lower part inner surface portion having channel means the length thereof to receive a tracer line.

3. A pipe and tracer line support subassembly for placement within a pipe hanger comprising:
a pipe supporting and thermal insulating housing having an outer surface of right circular cylindrical configuration to cooperate with existing insulation, said housing formed of an upper part and a lower part, one being larger and the other being smaller, said smaller part having an outer surface portion extending less than 180° in an arc swept from the axial centerline of said housing, said larger part having an outer surface portion extending more than 180° in an arc swept from the axial centerline of said housing and together extending 360°; said parts together also forming a basically cylindrical inner passage having an axial centerline parallel to and offset from the axial centerline of said outer cylindrical surface, said parts each having an inner surface portion extending 180° in arcs swept from the axial centerline of said inner passage; and said larger part inner surface portion having channel means the length thereof to receive a tracer line.

* * * * *